(12) United States Patent
DeCenzo

(10) Patent No.: US 8,244,975 B2
(45) Date of Patent: Aug. 14, 2012

(54) COMMAND QUEUE ORDERING BY FLIPPING ACTIVE WRITE ZONES

(75) Inventor: David P. DeCenzo, Pueblo, CO (US)

(73) Assignee: Seagate Technology LLC, Scotts Vallely, CA (US)

( * ) Notice: Subject to any disclaimer, the term of this patent is extended or adjusted under 35 U.S.C. 154(b) by 779 days.

(21) Appl. No.: 11/478,905

(22) Filed: Jun. 30, 2006

(65) Prior Publication Data

US 2008/0005463 A1    Jan. 3, 2008

(51) Int. Cl.
G06F 12/00 (2006.01)
G06F 13/00 (2006.01)

(52) U.S. Cl. .................. 711/112; 711/100; 711/154

(58) Field of Classification Search .............. 711/112
See application file for complete search history.

(56) References Cited

U.S. PATENT DOCUMENTS

| | | |
|---|---|---|
| 5,390,313 A | 2/1995 | Yanai et al. |
| 5,426,736 A | 6/1995 | Guineau, III |
| 5,463,758 A | 10/1995 | Ottesen |
| 5,664,143 A | 9/1997 | Olbrich |
| 5,787,242 A | 7/1998 | DeKoning et al. |
| 5,854,941 A | 12/1998 | Ballard et al. |
| 5,887,128 A | 3/1999 | Iwasa et al. |
| 6,018,790 A | 1/2000 | Itoh et al. |
| 6,028,725 A | 2/2000 | Blumenau |
| 6,061,194 A | 5/2000 | Bailey |
| 6,070,225 A | 5/2000 | Cheung et al. |
| 6,076,143 A | 6/2000 | Blumenau |
| 6,332,177 B1 | 12/2001 | Humlicek |
| 6,397,292 B1 | 5/2002 | Venkatesh et al. |
| 6,412,042 B1 | 6/2002 | Paterson et al. |
| 6,425,052 B1 | 7/2002 | Hashemi |
| 6,442,648 B1 | 8/2002 | Genduso et al. |
| 6,457,096 B1 | 9/2002 | Ageishi et al. |
| 6,490,636 B1 | 12/2002 | Kikuchi et al. |
| 6,502,178 B1 | 12/2002 | Olbrich |
| 6,553,454 B1 * | 4/2003 | Harada ................. 711/111 |
| 6,571,298 B1 | 5/2003 | Megiddo |
| 6,574,676 B1 | 6/2003 | Megiddo |
| 6,732,293 B1 * | 5/2004 | Schneider ............... 714/15 |
| 6,880,102 B1 | 4/2005 | Bridge |
| 6,978,324 B1 | 12/2005 | Black |
| 6,978,345 B2 | 12/2005 | Tomaszewski et al. |
| 7,194,589 B2 * | 3/2007 | Lahiri et al. .............. 711/156 |
| 2002/0083299 A1 | 6/2002 | Van Huben et al. |
| 2002/0091882 A1 | 7/2002 | Espeseth et al. |
| 2003/0225969 A1 | 12/2003 | Uchida et al. |
| 2004/0202073 A1 | 10/2004 | Lai et al. |
| 2005/0097132 A1 | 5/2005 | Cochran et al. |

* cited by examiner

Primary Examiner — Tuan V. Thai
(74) Attorney, Agent, or Firm — Hall Estill Attorneys at Law

(57) ABSTRACT

A data storage system is provided with a storage domain having an active zone subportion of storage space, and a command queue controller configured for short-stroking an actuator directed to the active zone. A method is provided for virtualizing a storage space to store user data in a first domain and redundant data in a second domain, partitioning each of the domains into active and inactive subportion storage zones, and executing a retrieve access command from one of the first and second domains depending on which domain's active zone contains an LBA associated with the retrieve access command.

19 Claims, 7 Drawing Sheets

COMMAND QUEUE ORDERING BY FLIPPING ACTIVE WRITE ZONES

FIELD OF THE INVENTION

The present invention pertains generally to enhancing throughput performance in a computer system, and more particularly without limitation to an apparatus and associated method for ordering a command queue in a virtualized storage space so that short-stroking can be continuously employed to reduce the average seek distance.

BACKGROUND

Computer systems can comprise input devices, output devices, one or more CPUs and storage devices that can include semiconductor RAM, EEPROM, disc drives, CD drives, other storage media, and intelligent controllers. An operating system can control the configuration of various peripherals, such as display adapters and network interfaces, for example, and provides an application environment and a data system that allocates or de-allocates storage capacity as files are created, modified, or deleted.

Specialized computer systems, such as servers and storage arrays, also employ a system for allocating storage capacity that can be accessed through a network or other connection. Data can be stored across a plurality of disc drives in redundant storage formats such as a redundant array of independent drives (RAID), for example. User data, and any mirror data or parity data ("redundant data"), is mapped to one or more areas on one or more disc drives. Configuration information describing the manner in which data is stored to one or more disc drives is contained in tables or other data structures termed metadata. As files are created, modified, or deleted, the metadata is updated to reflect the allocation or de-allocation of storage capacity.

The performance of the computer system in passing host access commands (both store and retrieve commands) to the storage array can be enhanced by write-caching the access commands and immediately acknowledging them to the host. This permits the actual transfer between the storage array and the cache to take place at an optimal time in relation to holistically viewing system resources against system needs. For example, many times access commands that are pending in the command queue can be performed when the data storage device is otherwise not presently needed by the system.

However, allowing the command queue to grow deep can bog down the system throughput performance, and makes data mismatches more problematic by accumulating an excessive number of acknowledged but not yet satisfied access commands. For this reason it is desirable to pass commands in the command queue as efficiently as possible.

Accordingly, there is a continual need for improvements in the manner in which command queues are managed. It is to these and other improvements that the embodiments of the present invention are generally directed.

SUMMARY OF THE INVENTION

As embodied herein and as claimed below, embodiments of the present invention are generally directed to efficient command queue scheduling to maximize data storage system throughput performance.

In some embodiments a data storage system is provided with a storage domain having an active zone subportion of storage space, and a command queue controller configured for short-stroking an actuator directed to the active zone.

In other embodiments a method is provided for virtualizing a storage space to store user data in a first domain and redundant data in a second domain. The method further provides for partitioning each of the domains into active and inactive zones of storage space. The method further provides for executing a retrieve access command from one of the first and second domains, depending on which domain's active zone contains an LBA associated with the retrieve access command.

In other embodiments a data storage device is provided with a RAID storage configuration and means for ordering commands in a command queue to continuously short-stroke data storage devices forming the RAID.

These and various other features and advantages which characterize the embodiments of the claimed invention will become apparent upon reading the following detailed description and upon reviewing the associated drawings.

DETAILED DESCRIPTION

Figure 1:
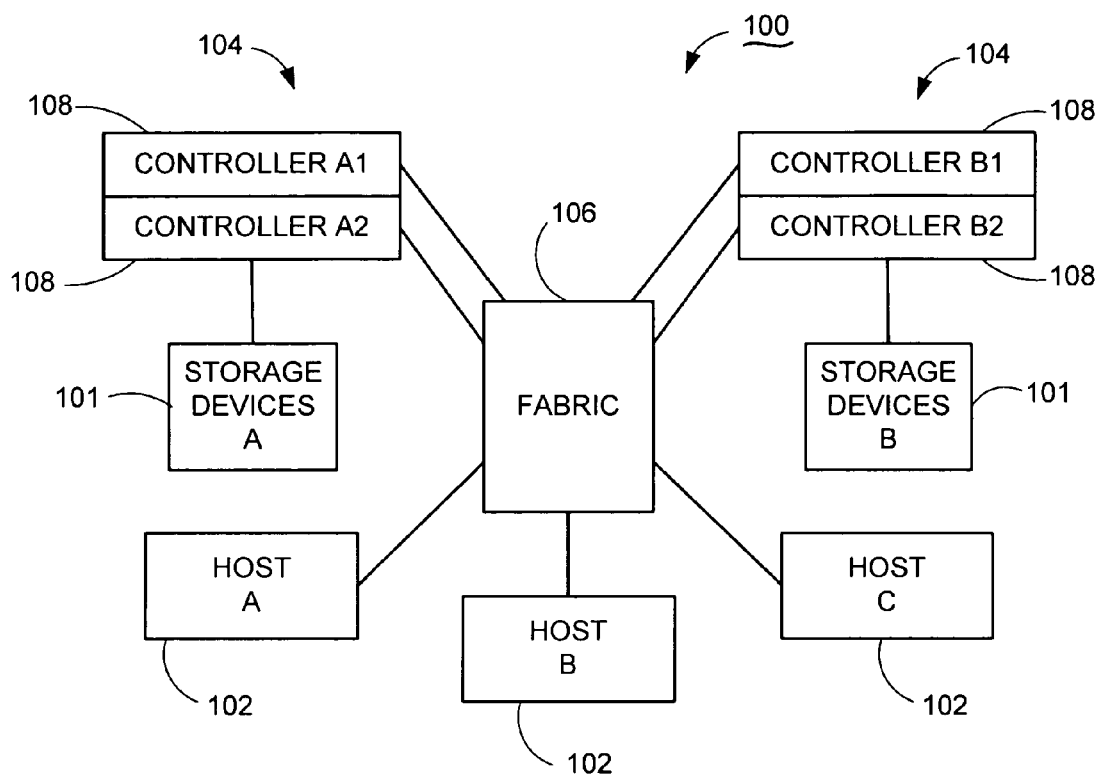
FIG. 1 is a top level functional block depiction of a computer-based system characterized as a wide-area network utilizing mass storage.

Embodiments of the present invention can be employed in various environments such as computers or servers with internal or attached data storage devices, or in an intelligent storage system. Intelligent storage systems have intelligent controllers and interfaces and can have one or more data storage arrays. To illustrate an exemplary environment in which presently preferred embodiments can be advantageously practiced, FIG. 1 shows a computer-based system 100 characterized as a wide area network (WAN) utilizing mass storage.

The system 100 includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well, including the Internet.

Each array 104 includes a pair of controllers 108 (denoted A1, A2 and B1, B2) and a set of data storage devices 101 presently characterized as disc drives, without limitation, operated as a RAID. The controllers 108 and data storage devices 101 preferably utilize a fault tolerant arrangement so that the various controllers 108 utilize parallel, redundant links and at least some of the user data stored by the system 100 is stored in a redundant format within at least one set of the data storage devices 101.

It is further contemplated that the A host computer 102 and the A data storage array 104 can be physically located at a first site, the B host computer 102 and B storage array 104 can be physically located at a second site (remotely to A and C), and the C host computer 102 can be yet at a third site (remotely to A and B), although such is merely illustrative and not limiting.

Figure 2:
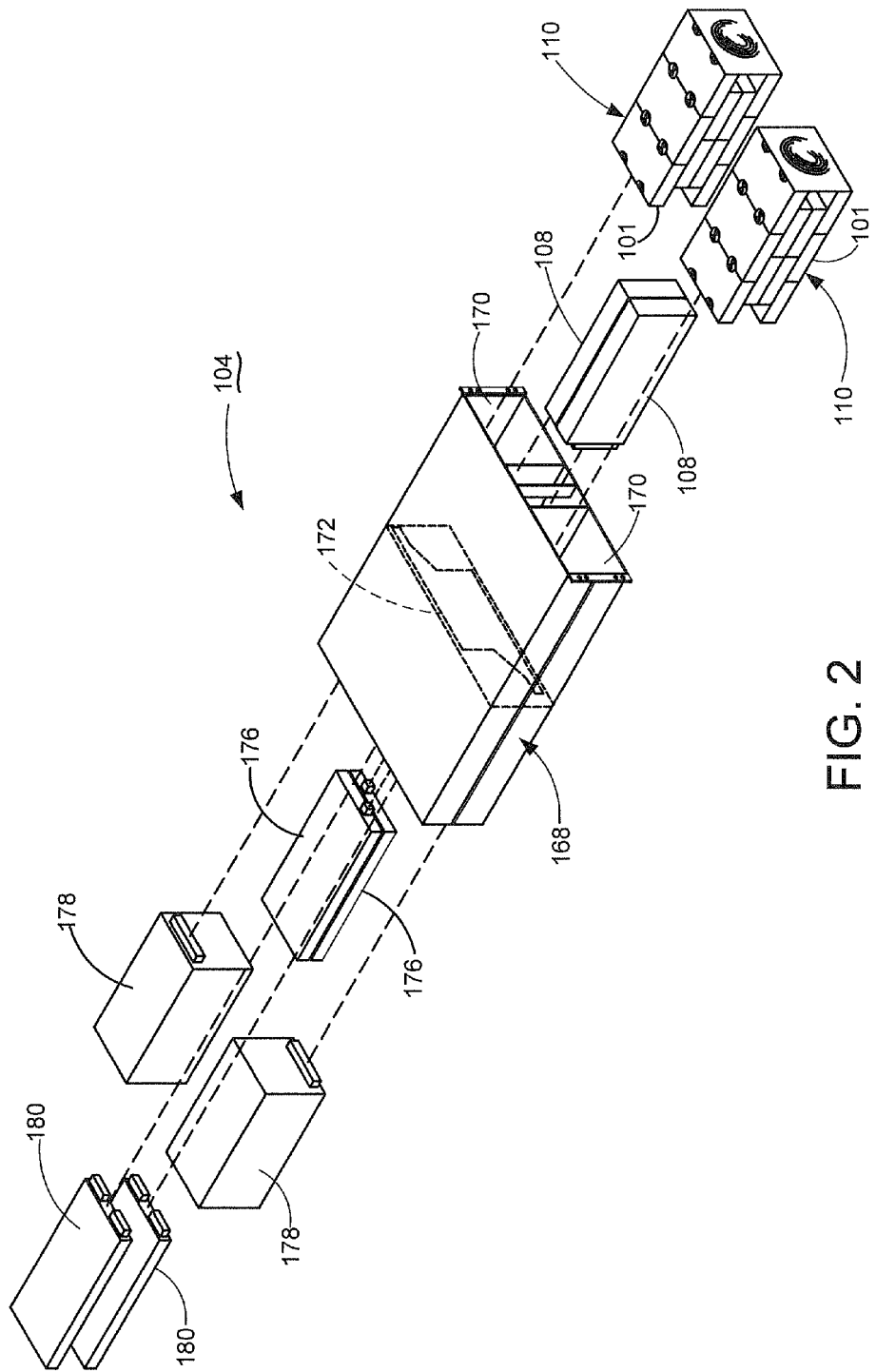
FIG. 2 is an exploded isometric view of a pertinent portion of a computer-based system constructed in accordance with FIG. 1.

FIG. 2 illustrates an array 104 that is constructed in accordance with embodiments of the present invention. Two multiple drive arrays ("MDA") 110 are utilized, each with a capacity of ten data storage devices 101. The MDA 110 advantageously provides a convertible plurality of the data storage devices 101 for mass storage. By "convertible" it is meant that one or more of the data storage devices 101 can be readily replaced, added, or removed in an existing MDA 110, or that a different MDA can be utilized that is capable of supporting a different number, size or arrangement of data storage devices 101. By "componentized" it is meant that the data storage devices 101 and associated control electronics in the MDA 110 are collectively integrated so as to be functionally presentable by the array 104 as a seamless block of storage capacity.

Figure 3:
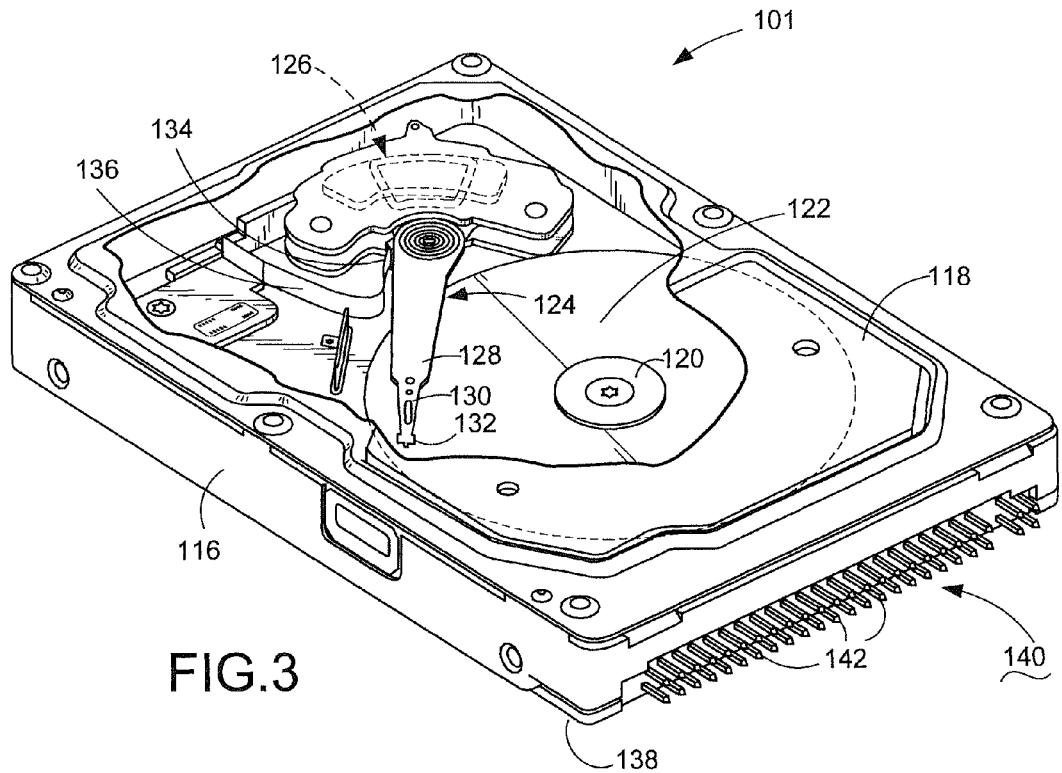
FIG. 3 is an isometric view of a data storage device that can be used in practicing the embodiments of the present invention.

FIG. 3 shows an isometric view of one of the data storage devices 101 with which embodiments of the present invention can be advantageously practiced. It will be understood, however, that the embodiments of the present invention are not so limited.

The data storage device 101 preferably includes a base 116 and a cover 118 (partially cutaway), which together provide a housing for a number of components. The components include a motor 120 to which is fixed one or more storage mediums 122 in rotation therewith. Adjacent the storage medium 122 is an actuator assembly 124 that pivots around a bearing assembly through application of current to a voice coil motor (VCM) 126. In this way, controlled operation of the VCM 126 causes the actuator 124 to move radially across the storage medium 122.

The actuator assembly 124 includes an actuator arm 128 supporting a load arm 130 that, in turn, supports a head 132 (or "transducer") at a distal end thereof in a data transfer relationship with the adjacent storage medium 122. Each storage medium 122 can be divided into data tracks, and the head 132 is positionable to retrieve data from and store data to the tracks.

To provide the requisite electrical conduction paths between the head 132 and data storage device 101 control circuitry, the head 132 advantageously has a flex circuit that is routed on the actuator assembly 124 from the head 132, along the load arm 130 and the actuator arm 128, and to a circuit portion 134 that is supported by a proximal end (sometimes referred to as "E block") of the actuator assembly 124. The circuit portion 134 connects the head 132 flex circuit to another flex circuit 136 which passes through the base 116 to a printed circuit board (PCB) 138. An electrical connector 140 attached to the PCB 138 has a plurality of contacts 142 for connecting the data storage device 101 to a mating connector (not shown), such as for placing the data storage device 101 in communication with external control circuitry.

Figure 4:
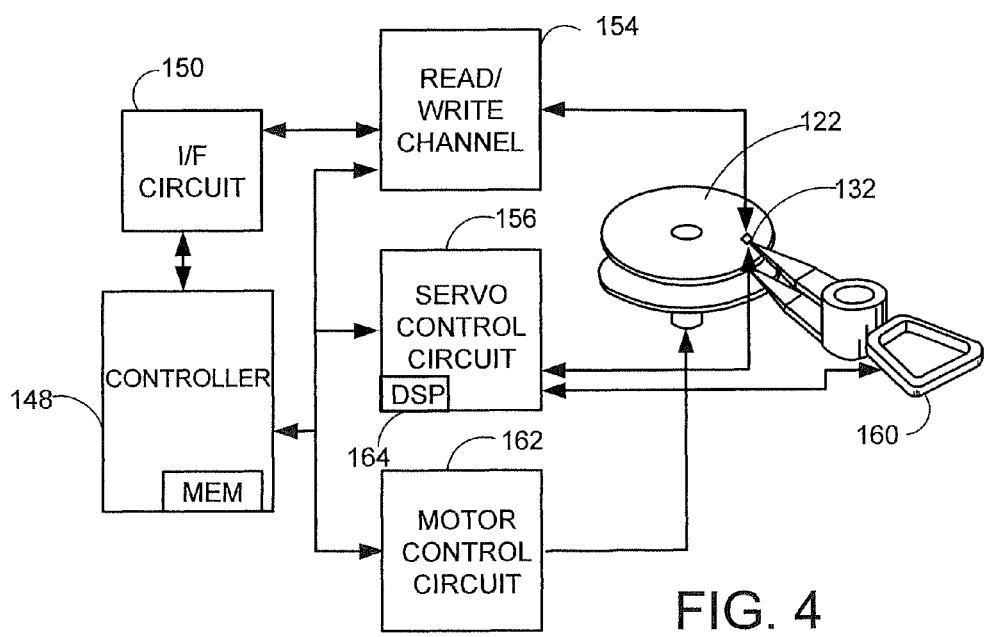
FIG. 4 is a functional block depiction of the data storage device of FIG. 3.

FIG. 4 provides a functional block diagram of the data storage device 101 of FIG. 3. A programmable controller 148 provides top-level communications and control for the data storage device 101. An interface (I/F) 150 facilitates input and output (I/O) communications and transfers to an external device with which the data storage device 101 can be associated. A read/write (R/W) channel 154 conditions data to be written to the storage medium 122 during a data store operation, and reconstructs data retrieved from the storage medium 122 for transfer to the external device during a data retrieve operation.

A servo circuit 156 provides closed-loop positional control for the heads 132, such as by using servo data stored to the storage medium 122. The servo circuit 156 is preferably configured to carry out a number of control functions including track following operations whereby a selected head 132 follows a desired track on the storage medium 122, seek operations whereby a selected head 132 is moved from an initial track to a destination track, and head 132 load/unload operations whereby the heads 132 are moved away from or to a parking zone or structure.

The servo circuit 156 applies the requisite currents to a coil 160 of the VCM 126 to selectively move the heads 132 in relation to the tracks of the storage medium 122. The servo circuit 156 further preferably includes a spindle motor driver circuit 162 to control the spindle motor 120. Processing requirements to carry out these and other servo functions are preferably supplied by a digital signal processor (DSP) 164 or other processing device of the servo circuit 156, such as an ARM. The servo processing can alternatively be supplied by the top level controller 148 in a single processor environment.

Returning now to FIG. 2, a shelf 168 defines cavities 170 into each of which an MDA 110 is receivingly engageable for communication with a backplane 172. Similarly, the shelf 168 defines cavities for receivingly engaging other electrical modules with the backplane 172, such as, but not limited to, storage controllers 108, batteries 176, power supplies 178, and interfaces 180.

Figure 5:
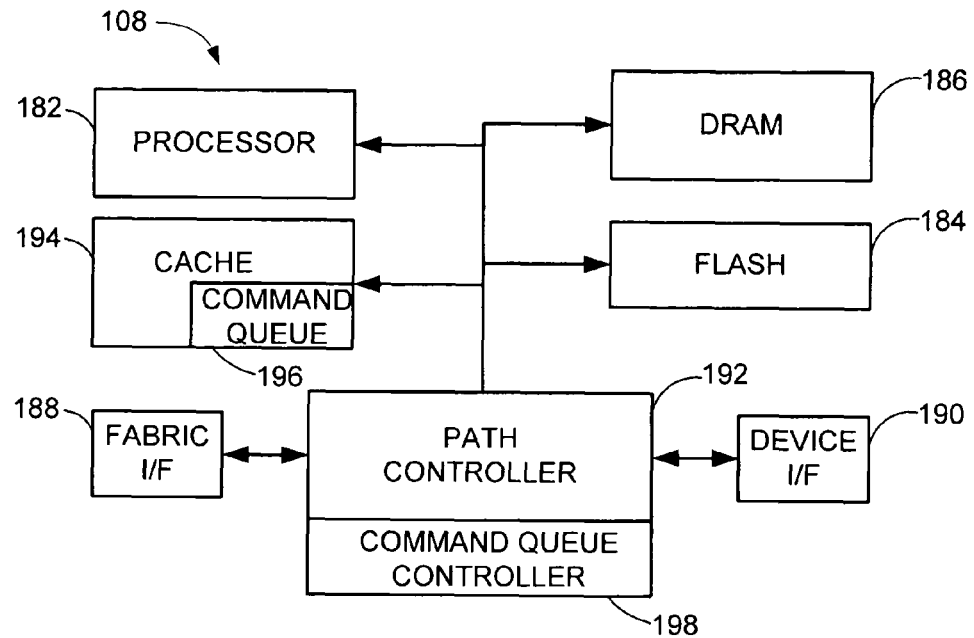
FIG. 5 provides a functional block diagram illustrating a selected one of the controllers of FIG. 1.

FIG. 5 illustrates a selected one of the controllers 108 in greater detail. The controller 108 can be embodied in a single integrated circuit, or distributed among a number of discrete circuits as desired. A main processor 182, preferably characterized as a programmable, computer processor, provides control in accordance with programming steps and processing data preferably stored in non-volatile memory 184 (such as flash memory or similar) and in dynamic random access memory (DRAM) 186.

A fabric interface (I/F) circuit 188 communicates with the other controllers 108 and the host computers 102 via the fabric 106 (FIG. 1), and a device I/F circuit 190 communicates with the data storage devices 101. The I/F circuits 188, 190 and a path controller 192 form a communication path to pass commands and data between the storage array 104 and the host 102, such as by employing the cache memory 194. Although illustrated discretely, it will be understood that the path controller 192 and the I/F circuits 188, 190 can be unitarily constructed.

Preferably, in order to increase host processing performance, write commands are write-back cached in the cache memory 194 and held as pending therein within a command queue 196. A command queue controller 198 portion of the path controller 192 orders the passing of the write commands, as well as higher priority read commands, according to the embodiments of the present invention.

The data storage capacity of an array 104, defined by the combined capacities of the data storage devices 101, is organized into logical devices that can be written to and read from the array 104. System configuration information defines the relationship between user data, as well as any associated parity and mirror data ("redundant data"), with the respective storage locations. The system configuration information furthermore identifies the relationship between blocks of storage capacity allocated to data and the memory storage locations, such as logical block addresses (LBA). The system configuration information can furthermore include virtualization by defining virtual block addresses that are mapped to logical block addresses.

Embodiments of the present invention employ a data storage grid architecture mapped across a plurality of the data storage devices 101. A data grid comprises a plurality of consecutive data blocks in a plurality of storage domains. A first data block of each plurality of data blocks for each of the storage domains is typically at the same address (called a grid base address), simplifying address generation; however, differing base addresses for two or more storage domains can be employed. The grid provides a predefined amount of data storage space. The amount of data storage space in a grid can be allocated to one logical unit, and grids can be virtually mapped in simplifying metadata overhead.

Figure 6:
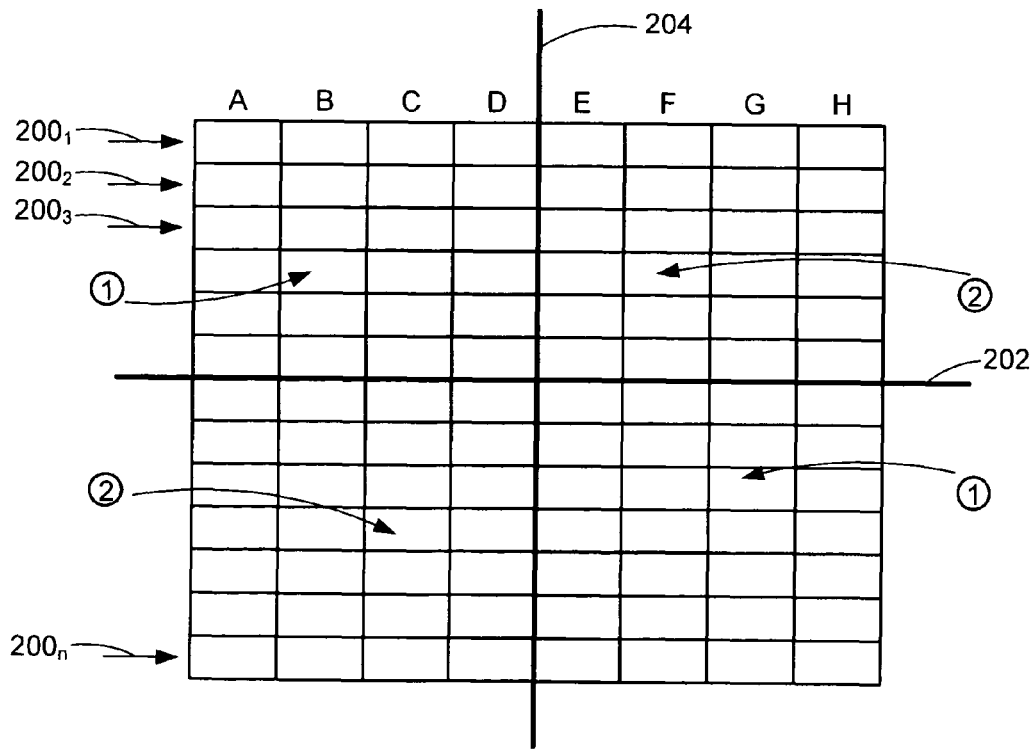
FIG. 6 is a diagrammatic illustration of a data storage grid employing a RAID 1 storage system in accordance with embodiments of the present invention.

FIG. 6 depicts a data storage grid that can be viewed as a two dimensional array of equal-sized data blocks. Columns in the array correspond to data storage devices 101 and rows correspond to data blocks starting at the same LBA in each data storage device 101. Accordingly, the data storage grid in FIG. 6 has a plurality of rows 200 that intersect the data storage devices 101 (domains) designated A, B, C, D, E, F, G, and H to define the array of data blocks.

Data blocks in a grid are of equal size (storage capacity) but are not limited to a particular size. The size of a data block can be specified when configuring a storage system and can reflect the size (storage capacity) of data storage devices in the system, user applications, controller hardware and software, and other factors. Rows 200 are contiguous in that there is no undefined storage space between adjacent rows of the grid. The starting address of the first row in the grid serves as the base address for the grid, and grids can be defined such that the base address is aligned to an address that is a multiple of the size of a data storage block multiplied by the number of rows in a grid.

Grids can be numbered, and the storage capacity contained in a grid can be allocated using a pointer to the grid. A pointer table can associate a pointer with a grid number, providing easy virtualization and reducing metadata overhead. Pluralities of grids can be defined that occupy a portion of the available storage capacity of the data storage devices in the array. Drives or data blocks of grids can be designated as spare(s), providing additional storage capacity that can be employed to contain reconstructed or copied data in the event of failure of other data storage devices in the system. Data blocks in a grid can also be dedicated for use in storing only primary user data or in storing only redundant data for error recovery.

The grid in FIG. 6 is preferably divided into four equal-size quadrants by the horizontal and vertical divider lines 202, 204. The vertical divider line 204 separates the first four domains A, B, C, and D from the last four domains E, F, G, and H. Such a separation is useful in employing a RAID 1 data system, such as is used in the discussion that follows for illustrative purposes. That is, for each store access command that is executed, primary (user) data is stored in one of the primary domains A, B, C, and D, and the primary data is mirrored in the respective redundant domains E, F, G, and H. For the sake of simplicity, the virtualized storage space is mapped to the grid beginning at the same LBA in each of the domains. Furthermore, data stored in primary domain A is mirrored in redundant domain E, and so forth.

The horizontal divider line 202 separates each of the domains into an outer half and an inner half of the data storage medium 122. Accordingly, the quadrants are paired into zones labeled zone 1 and zone 2. That is, zone 1 includes the outer half of primary domains A, B, C, and D and the inner half of redundant domains E, F, G, and H. Zone 2 includes the inner half of primary domains A, B, C, and D and the outer half of redundant domains E, F, G, and H.

Figure 7:
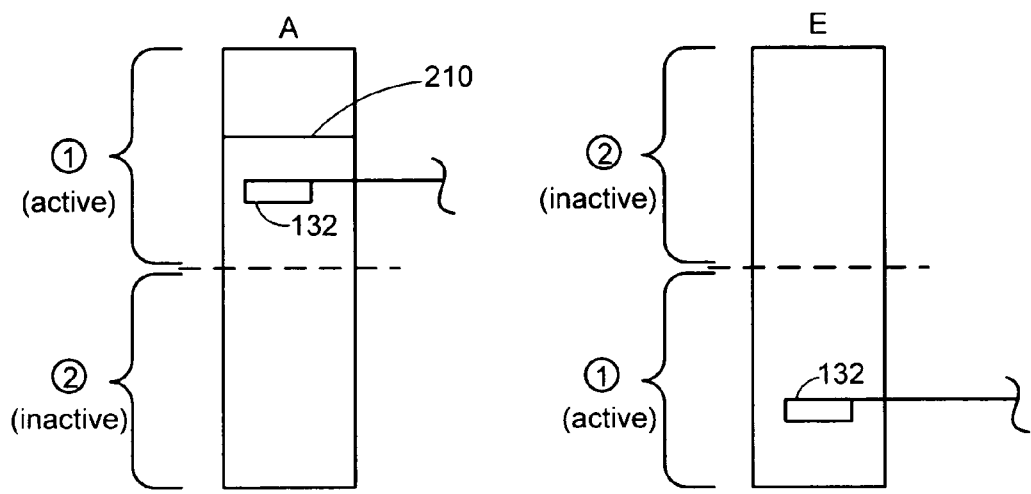
FIG. 7 is a diagrammatic illustration of a portion of the data storage grid of FIG. 4.

FIG. 7 is a simplified diagrammatic portion of the grid of FIG. 6, showing only primary storage domain A and its redundant storage domain E. The path controller 192 has designated zone 1 as being the active zone, as indicated by the heads 132 being disposed within and directed to movement to the tracks within zone 1. That is, the head 132 in domain A is directed to movement only adjacent the outer half, and the head 132 in domain E is directed to movement only adjacent the inner half, of the respective data storage mediums 122.

It will be noted that the primary storage domain A active zone contains LBAs that are different than the LBAs contained in the redundant storage domain E active zone, because the active and inactive zones preferably do not overlap. However, preferably the LBAs in the primary storage domain A active zone combined with the LBAs in the redundant storage domain E active zone represent a full complement of the LBAs on each of the two domains, so that any arbitrary read command can be satisfied by one or the other of the two domains.

In this arrangement data store access commands are passed by the command queue controller 198 only for those in zone 1 (the active zone). A pending data store access command destined for zone 2 (the inactive zone) will be held as pending in the command queue 196. When a threshold number of data store access commands are pending for the inactive zone, the command queue controller 198 can flip the zones to make zone 2 active and zone 1 inactive, as shown in FIG. 8.

Figure 8:
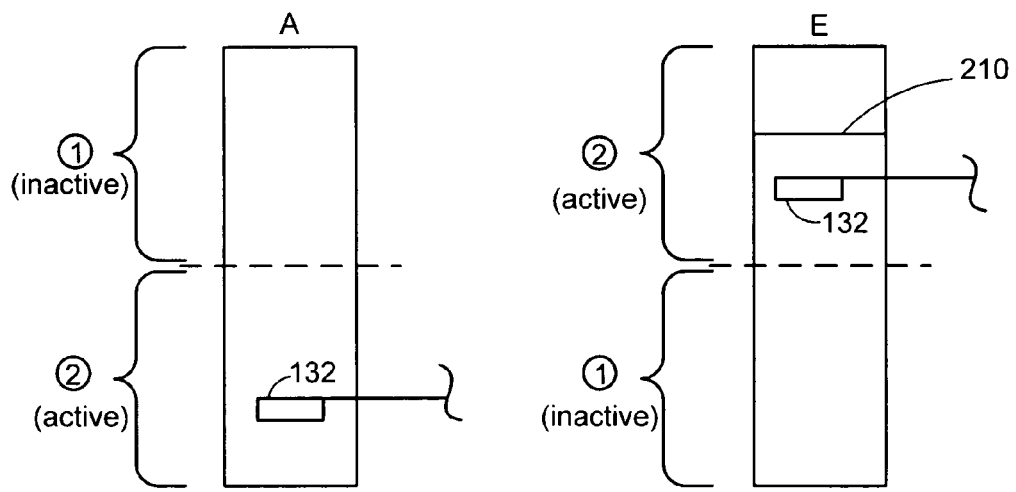
FIG. 8 is a diagrammatic illustration similar to FIG. 7 but after the active zones have been flipped.

However, in either arrangement of FIG. 7 or FIG. 8 a higher priority data retrieve access command can be passed to either of the domains immediately upon receipt, depending upon which of the active domains contains the LBA associated with the data retrieve access command. Because the respective head 132 is constrained to move only halfway across the storage medium 122, the domain to which the data retrieve access command is passed will always be short-stroked, thereby increasing the seek efficiency in accessing the data. For example, in the FIG. 7 condition (zone 1 active) a data retrieve access command associated with LBA 210 will be passed to domain A, but in the FIG. 8 condition (zone 2 active) the same data retrieve access command will be passed to domain E. In both cases the actuator 124 is short-stroked to reduce the seek time.

Figure 9:
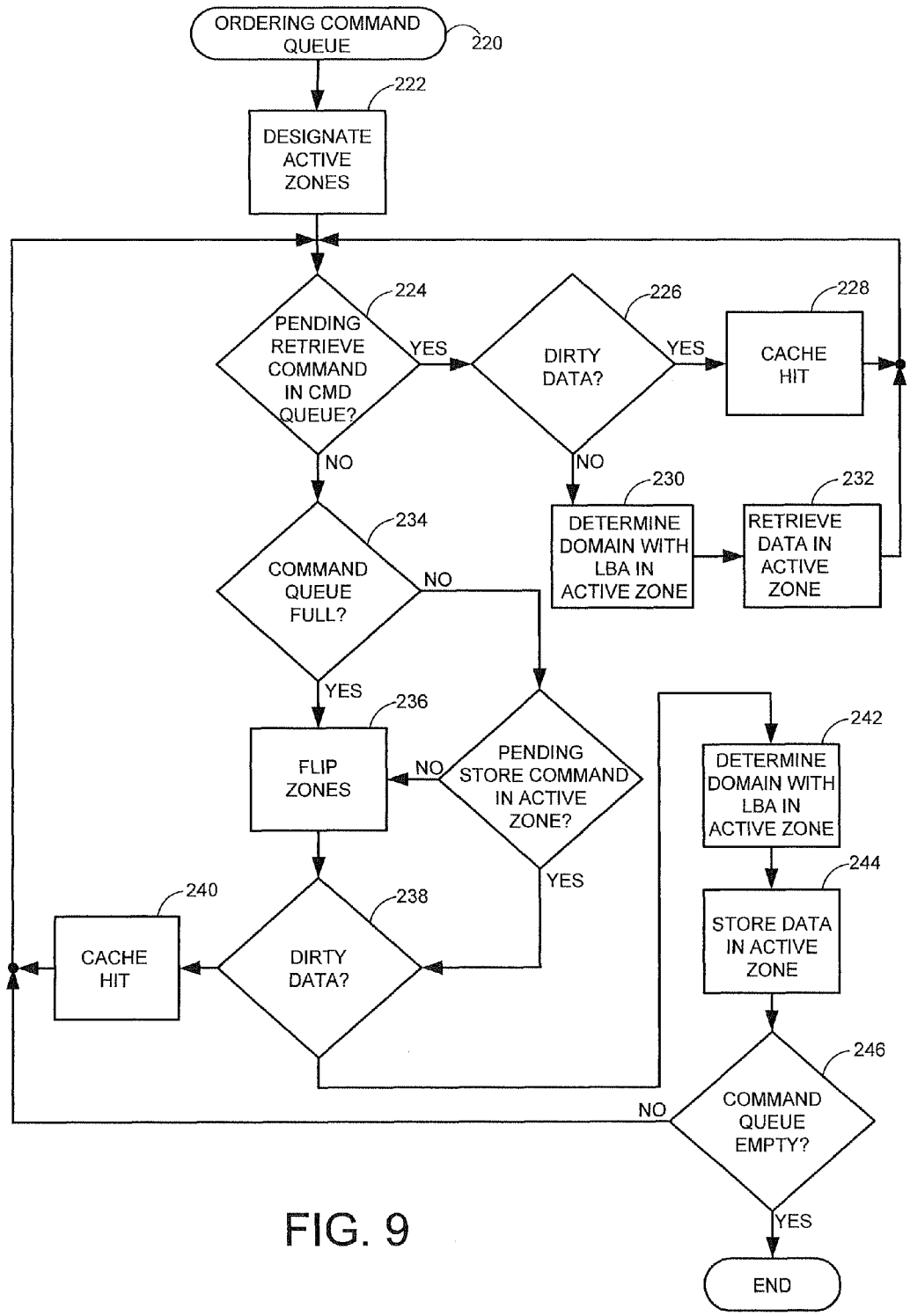
FIG. 9 is a flowchart illustrating steps for practicing a method of ORDERING A COMMAND QUEUE in accordance with embodiments of the present invention.

FIG. 9 is a flowchart of a method 220 for ORDERING A COMMAND QUEUE in accordance with embodiments of the present invention. The method 220 begins in block 222 with the path controller 192 initially designating which zone is active, and hence the other zone (or zones) thereby being designated inactive by default.

In block 224 it is determined whether there are currently any high priority data retrieve access commands pending in the command queue 196. If the determination of block 224 is yes, then in block 226 the command queue controller 198 determines whether the requested data is dirty. If the determination of block 226 is yes, then a cache hit is made in block 228 to satisfy the data retrieve access command, and then control returns to block 224. If the determination of block 226 is no, then in block 230 the path controller 192 determines which domain has an active zone containing the LBA associated with the pending retrieve command. In block 232 the path controller 192 retrieves the data from the active zone and control returns to block 224.

If the determination of block 224 is no, then in block 234 the path controller 192 determines whether the command queue 196 is full (deeper than a predetermined threshold). If the determination of block 234 is yes, then in block 236 the path controller 192 flips the active and inactive zones to flush write commands previously accumulated as destined for the inactive zone.

Before executing the flipping step in block 236 the path controller 192 can handle pending write commands to the active zones in any of a number of different ways. For example, in some embodiments the command queue depth can be reduced as much as possible by executing all pending write commands to the currently active zones before flipping the zones. Alternatively, for faster flipping response the pending write commands can be held in the command queue 196 until the zones are flipped again, to make them again destined for the active zones. In compromise solutions a predetermined number of pending write commands or only already initiated write commands to the active zone can be passed before executing the flipping step in block 236.

If the determination of block 234 is no, then in block 235 it is determined whether one or more pending store commands exist in the command queue that are destined for the active zones. If the determination of block 235 is no, then control passes to block 236 where the path controller 192 flips the active and inactive zones as discussed above. Otherwise, if the determination of block 235 is yes, then control passes to block 238 where it is determined whether a pending write command is associated with dirty data. If the determination of block 238 is yes, then the path controller 192 directs a cache hit in block 240 to satisfy the pending write command and control returns to block 224. If the determination of block 238 is no, then in block 242 the path controller 192 identifies a pending write command in the command queue 196 associated with an LBA contained by a presently active zone in one of the domains. In block 244 the path controller 192 passes the identified pending write command to the active zone. In these embodiments the method 220 is sequenced for each individual store command. Alternatively, the determine step 242 and store step 244 can process a batch of store commands from the command queue 196 each time the method 220 is sequenced. The size of the batch can be fixed, or alternatively it can be varied in response to the observed load on the cache 194, such as by responding to saturation of the cache 194 by increasing the batch size to prevent flipping zones when the current zones are preferred but the command queue 196 nonetheless exceeds the threshold during the saturation event.

Finally, in block 246 it is determined whether the command queue 196 is empty; if yes, the method ends and if no, then control returns to block 224.

Figure 10:
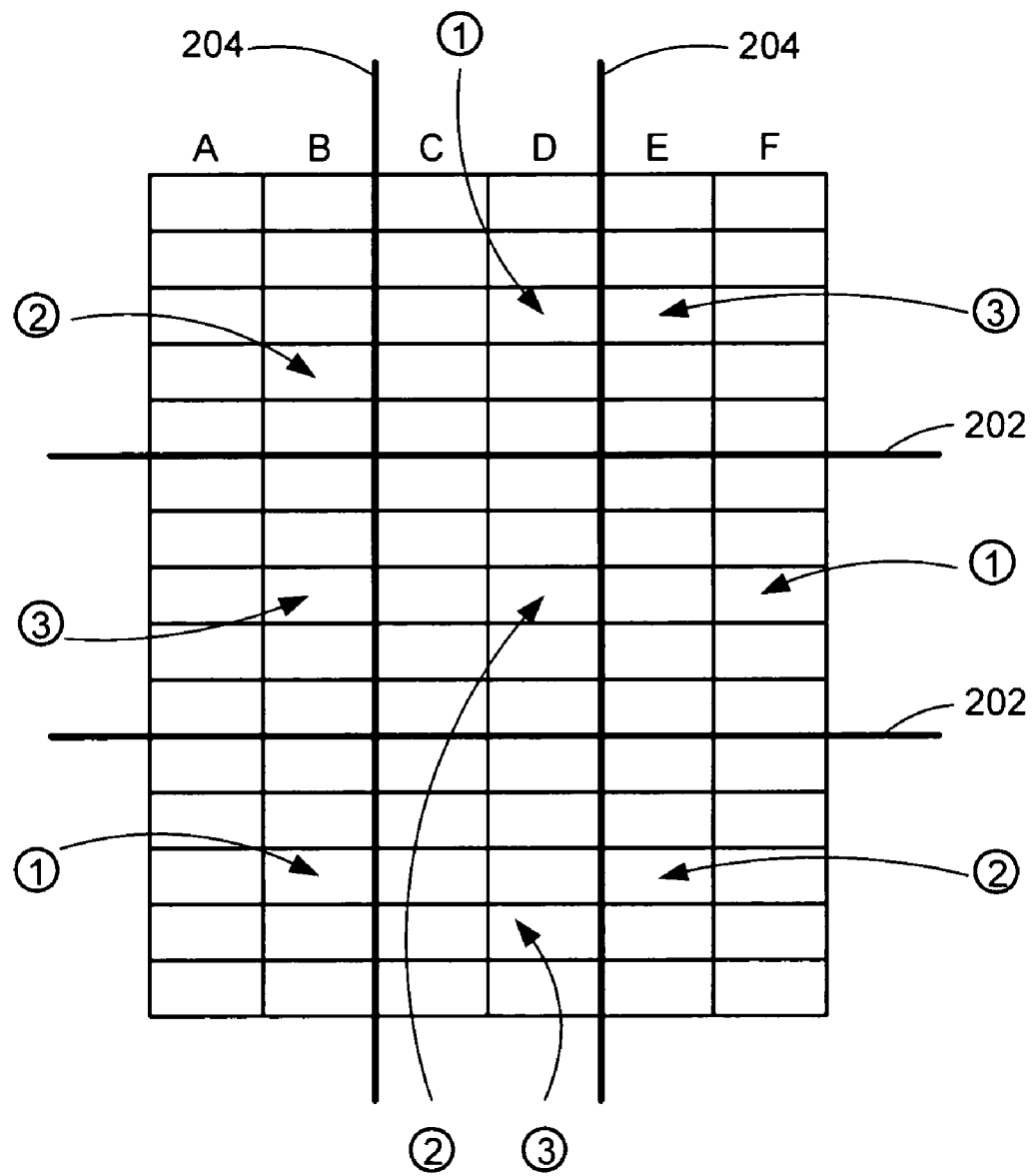
FIG. 10 is a diagrammatic illustration of a data storage grid employing a RAID 1 by 3 storage system in accordance with embodiments of the present invention.

The illustrative embodiments of the present invention used in a RAID 1 configuration employed one active zone and only one inactive zone in each of the domains. However, in other embodiments this general approach can be expanded to employ one active zone and a plurality of inactive zones in order to further reduce the average seek distance within the active zone. FIG. 10, for example, shows a data grid with user data domains A, B, C, and D and row and column parity domains E and F, respectively, that can be advantageously employed in a RAID 1 by 3 configuration. It will be noted in this arrangement that three zones can be defined so that each of the domains at any given time has an active zone and two inactive zones.

In the embodiments discussed above the command queue controller 198 is contained within the controller 108 in the MDA 110. These descriptions are illustrative only and not limiting to the scope of the present embodiments, which also contemplates placing some or all of the functionality of the command queue controller within the host 102 or some other external device therebetween the host and the MDA 110, or within the data storage device 101.

Summarizing generally, preferred embodiments of the present invention are characterized as a data storage system having a RAID storage configuration and means for ordering commands in a command queue to short-stroke data storage devices forming the RAID. The skilled artisan will understand from this description that the meaning of the term "means for ordering commands," for purposes of this description and the appended claims, requires the partitioned arrangement of active and inactive zone(s) in each of the plurality of domains forming the RAID, with the actuator being directed to seek only within the presently designated active zone in order to short-stroke it in satisfying access commands. The "means for ordering commands" also requires the combined active zones to be complementary so that that any priority access command, be it either a read or write command, can be immediately satisfied by one of the domains.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. A data storage system comprising a storage domain defining an active zone subportion of storage space that includes an innermost storage location and a command queue controller configured for short-stroking an actuator directed to the active zone by only executing pending access commands in a command queue that are associated with the active zone until a predetermined condition is satisfied with respect to nonexecuted pending access commands in the command queue that are not associated with the active zone.

2. The storage system of claim 1 wherein the storage domain is a primary storage domain and further comprising a redundant storage domain defining a respective active zone subportion of storage space, wherein a virtual storage space is mapped to the domains beginning at the same LBA in each domain.

3. The storage system of claim 2 wherein the active zone of the primary storage domain contains LBAs that are different than the LBAs contained in the active zone of the redundant storage domain.

4. The storage system of claim 3 wherein the LBAs in the primary storage domain active zone combined with the LBAs in the redundant storage domain active zone represent a full complement of the LBAs on each of the two domains.

5. The storage system of claim 2 comprising inactive zones in each of the plurality of storage domains, each inactive zone having LBAs that are not contained in the active zone of the respective domain.

6. The storage system of claim 5 comprising a flipping feature whereby the command queue controller flips the zone status in each domain so that the active zones become second inactive zones and the inactive zones become second active zones.

7. The storage system of claim 6 wherein each domain has only one active zone and only one inactive zone.

8. The storage system of claim 6 wherein each domain has only one active zone and two or more inactive zones.

9. The storage system of claim 1 wherein the predetermined condition is characterized as a number of the nonexecuted pending access commands in the command queue exceeding a predetermined threshold.

10. A method comprising:
virtualizing a storage space to store user data in a first domain and to store redundant data in a second domain;
after the virtualizing step, defining both an active zone subportion of storage space and an inactive zone subportion of storage space in each of the first and second domains, wherein the active zone in one of the first and second domains includes an innermost storage location; and
short-stroking respective actuators within each of the active zones by only executing pending access commands in a command queue that are associated with the active zones until a predetermined condition is satisfied with respect to nonexecuted pending access commands in the command queue that are not associated with the active zones.

11. The method of claim 10 wherein the virtualizing step is characterized by beginning at the same LBA in each of the domains.

12. The method of claim 11 wherein the active zone of the first domain contains LBAs that are different than LBAs contained in the active zone of the second domain.

13. The method of claim 12 wherein the LBAs in the active zone of the first domain combined with the LBAs in the active zone of the second domain represent a full complement of the LBAs in each of the two domains.

14. The method of claim 13 further comprising a flipping step to make the active zones inactive and to make the inactive zones active.

15. The method of claim 14 further comprising executing a store access command associated with an LBA that is in an active zone of one of the domains.

16. The method of claim 15 wherein the executing a store access command is characterized by executing all pending store access commands in a command queue destined for the current active zones before executing the flipping step.

17. The method of claim 15 wherein the executing a store access command is characterized by holding pending store access commands destined for the active zones in a command queue when executing the flipping step.

18. The method of claim 17 wherein the executing a store access command is characterized by holding only non-initiated pending store access commands destined for the active zones in the command queue when executing the flipping step.

19. The method of claim 10 wherein the continuously short-stroking step is characterized by the predetermined condition being a number of the nonexecuted pending access commands in the command queue exceeding a predetermined threshold.

* * * * *